June 23, 1959 C. A. ESCOFFERY 2,892,136

RECTIFIER WITH MULTIPLE BARRIER LAYERS

Filed Sept. 9, 1957

INVENTOR.
CHARLES A. ESCOFFERY
BY D. Gordon Angus
ATTY.

2,892,136

RECTIFIER WITH MULTIPLE BARRIER LAYERS

Charles A. Escoffery, Los Angeles, Calif., assignor to International Rectifier Corporation, El Segundo, Calif., a corporation of California Application September 9, 1957, Serial No. 682,869

16 Claims. (Cl. 317—241)

Figure 2:
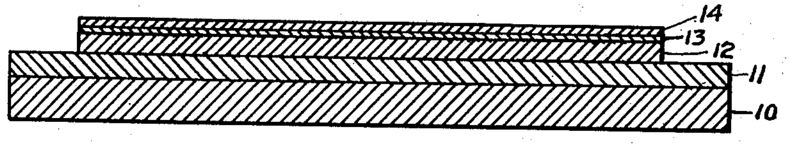

This invention relates to selenium rectifiers and has for an object to provide a selenium rectifier which is capable of withstanding a relatively high reverse voltage, with a relatively low current leakage in that direction, and which has a relatively low resistance in the forward direction.

Factors of importance in evaluating selenium rectifiers are its forward resistance, and its ability to withstand high voltage in the reverse direction. Selenium rectifier plates which are capable of withstanding around thirty-six volts or so in the reverse direction with an average forward voltage drop of about one volt are well known. However, attempts to manufacture efficient selenium rectifiers which are able to withstand much greater reverse voltages than this have met with difficulties, and it has not heretofore been practical to make selenium rectifiers which are able to withstand reverse voltages in excess of about forty-five volts R.M.S., and still have only a 1 volt voltage drop in the forward direction.

One type of construction of selenium rectifiers which is presently in use involves the deposition by evaporation in vacuum of a layer of selenium onto a base plate, with the subsequent application of an organic barrier layer on the selenium. A counter electrode layer is then applied upon the organic barrier layer.

Still another type of construction in current use incorporates the deposition of a layer of selenium upon a base plate and the subsequent application of an inorganic barrier layer of a cadmium salt upon the selenium coating. A counter-electrode is thereafter deposited upon the inorganic layer.

While both of these constructions result in rectifiers which have desirably low forward resistance characteristics, the reverse voltage which a rectifier of either of these constructions is able to withstand is only around thirty-six volts R.M.S. Furthermore, in the case of the construction utilizing the organic barrier layer, the leakage current in the reverse direction is comparatively high at low voltages, which is an undesirable characteristic for some applications such as for use in circuits which incorporate saturable reactors.

In accordance with the present invention, a rectifier is provided with multiple barrier layers between the selenium layer and the counter-electrode. One of these layers is comprised of a cadmium salt or mixture of cadmium salts, the preferred examples being cadmium sulphide, cadmium selenide, or a mixture of the two. The other of the barrier layers is comprised of an organic material such as organic polymers, organic resins or other organic, film-forming materials.

It has been found that the aforesaid rectifier, which is provided with multiple barrier layers, has an enhanced ability to withstand a high reverse voltage, which ability is obtained with no appreciable increase of forward resistance beyond that incurred in previously known selenium rectifiers. This is an unexpected result in itself. Furthermore, the life characteristics of this rectifier are improved over those of either of the aforesaid types of rectifiers which utilize only a single barrier layer.

The favorable and large increase in the reverse voltage characteristics obtained by the use of the multiple barrier layers as disclosed in this invention is also accompanied by a great decrease in the time which is necessary for electro-forming the rectifier to prepare it for use.

Figure 1:
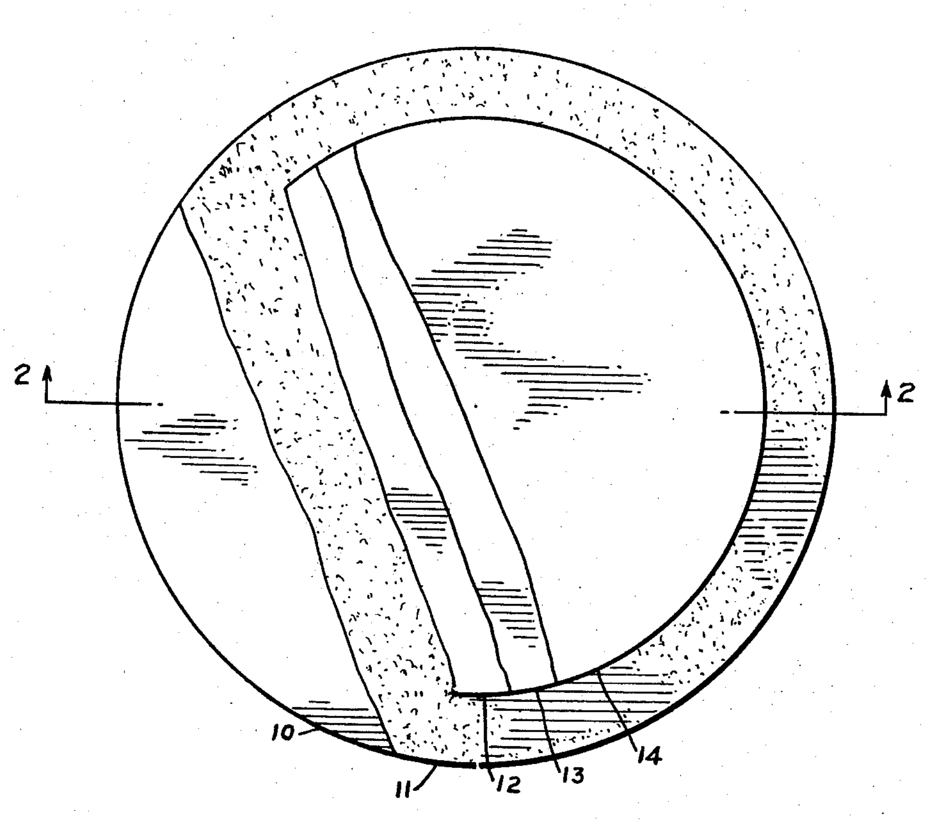

The above and other features of this invention will be fully understood from the following detailed description and the accompanying drawings of which:

Fig. 1 is a top view of a selenium rectifier according to this invention, some of the layers of said rectifier being broken away for purposes of illustration; and Fig. 2 is a cross section taken at line 2—2 of Fig. 1.

With particular reference to Fig. 2, there is shown a selenium rectifier having a base plate 10. This base plate is made of a metal which will ordinarily be a ferrous metal, or aluminum, one surface of which is roughened (the upper surface in Fig. 2). This surface is preferably nickel plated. A layer 11 of selenium is applied over this roughened surface, and is adherent thereto.

The selenium utilized in making this rectifier is preferably the "pure" or "rectifier" type which is available on the market. This type of very pure selenium, which has almost no impurities, is desirable in rectifier manufacture even when additives are later to be put into said selenium. By utilizing selenium of high initial purity, then additives can later be added so that the proportion of additive in the selenium can be closely controlled.

The layer 11 of selenium can be applied in any suitable manner, of which several are known in the art and require no detailed description here. It has been found that a preferable means for depositing layer 11, is by placing the base plate in a vacuum chamber and evaporating selenium with its additives into the chamber. The selenium with its additives then is deposited in an even layer on the base plate. This procedure provides a layer 11 which appears to have optimum properties for a rectifier.

Still another means for preparing layer 11 is to apply amorphous selenium to the surface of the base plate and then to crystallize it by an annealing treatment. A convenient way to do this is to spread amorphous selenium over the roughened and nickel-plated surface of the plate 10. The selenium is pressed against the base plate by placing a pressure plate over the selenium and applying pressure in the order of one thousand pounds per square inch at a temperature of about 125° to 130° C. for a couple of minutes or more. As is well known, this treatment sinters the selenium particles to cause them to coalesce and adhere to the base plate 10 in crystalline form. In either of the above manufacturing processes a useful layer 11 will result.

If desired, a further annealing treatment is given the selenium after its deposition on the base plate which can be accomplished by heating it for half an hour or so at a temperature just under the melting point of selenium, for example around 217° C.

Although the foregoing explanation has been given as a brief outline of a way of obtaining a crystallized selenium layer on the base plate, it is to be understood that the particular manner of obtaining the layer 11 does not form a part of this invention, and that any other desired means may be utilized and still remain within the spirit of the invention.

Over the selenium layer and adherent to it, there is applied a first barrier layer 12, comprising an inorganic metal salt. The salts used for layer 12 are preferably cadmium salts, and in the preferred embodiment, the salt or salts used will be selected from the group consisting of cadmium sulphide, cadmium selenide, or a mixture of cadmium sulphide and cadmium selenide. This inorganic metal salt may conveniently be applied to the layer 11 by evaporating the selected salt or salts in a vacuum, and depositing the same from the vacuum onto layer 11. This applies a very thin layer of the inorganic metal salt on the selenium to form inorganic barrier layer 12.

A second barrier layer 13 is applied over the first barrier layer and is adherent thereto. This second barrier layer consists essentially of an organic film. A convenient means for applying the organic layer 13 is to spread a lacquer of the desired organic material onto the surface of layer 12, and to permit the solvent to evaporate therefrom so as to leave the organic material as a film adherent to layer 12. The term "lacquer" as used herein comprehends liquid mixtures, suspensions or solutions comprising the organic material which is to make the second barrier layer, along with any desired additives, in an evaporable solvent or dispersion medium (usually, but not necessarily, an organic substance).

There is a large selection of organic materials which are suitable for layer 13, the principal consideration being that the selected material form a tight, adherent film over the first barrier layer. Examples of useful organic materials are the following: Polyamide resins such as nylon; nitro-cellulose; cellulose acetate; ethyl cellulose; cellulose aceto-butyrate; and resins such as polystyrene; and phenolic resins.

A suitable cellulose aceto-butyrate is sold under the name of Half-Second Butyrate by Eastman Chemical Products, Inc., a division of Eastman Kodak Co., Kingsport, Tennessee. When cellulose aceto-butyrate is used in a lacquer, a suitable solvent is a blend of toluene and methyl or ethyl alcohol, for example 60% toluene and 40% ethanol, by weight.

A suitable polystyrene is sold under the names PS–3 and PS–15 by Dow Chemical Company, Midland, Michigan.

Examples of suitable phenolic resins are Durite Resin AL–5271, made by Borden Chemical Company; Durez #175 made by Durez Plastic and Chemical Company; and Plyophen #5031 made by Reichhold Chemical Company.

When nitro-cellulose is used in a lacquer to form layer 13, there can be used as solvents to form the lacquer, substances such as esters and ketones, for example, methyl-ethyl ketone, acetone, ethyl acetate, or mixtures of these substances. Only a small amount of the nitro-cellulose will be used in the solvent, for example, about 0.1% to 2% by weight of nitro-cellulose. When nitro-cellulose is used, a plasticizer or suitable additive such as dibutyl phthalate is desirable to provide proper stability.

When nylon is used for the organic substance in layer 13 the lacquer can be prepared by using a small amount of nylon; for example, about 0.05% to 3% by weight of nylon in a suitable solvent, which solvent may be a mixture of 85% isopropyl alcohol and 15% water by weight. Nylon is essentially a polymeric polyamide resin, more particularly a carbonamide. A suitable nylon for rectifier usage is that which was formerly designated and sold as FM6501, by E. I. du Pont de Nemours and Company, Wilmington, Delaware. A similar product is now sold by the said company as Zytel 61 and also Type 8, these being soluble nylon resins.

When ethyl cellulose is used for the organic layer, a suitable lacquer can be prepared by dissolving the ethyl cellulose in solvents such as a mixture of aromatic hydrocarbons and lower aliphatic alcohols. One suitable solvent mixture comprises 80% toluol and 20% ethanol. About 0.05% to 1% by weight of the ethyl-cellulose is satisfactory for use in this lacquer.

Cellulose acetate may be dissolved, about 0.05–3.0% by weight in acetone, methylcellosolve acetate, nitromethane, or mixtures of these, to which may be added co-solvents such as methanol or ethanol.

This rectifier can be even more improved by the addition to the lacquer of certain additives, so that these additives are deposited in the organic barrier layer. Such additives are supplied in small amounts to increase the reverse resistance of the rectifier. Suitable examples are selenium dioxide, magnesium nitrate, calcium nitrate, and certain amines. The following amines may be used for this purpose: aniline, para phenylene diamine, meta phenylene diamine, pyridine, ethylene diamine, diethyl amine, monoethanolamine, diethanolamine, triethanolamine, morpholene, diethylene triamine, toluene diamine, toluidine, n-methyl para phenylenediamine, n-methyl meta phenylenediamine and benzidine.

After the solvent has been evaporated from the lacquer which was applied to the surface of the cadmium salt, leaving the second barrier layer 13 in place, a metallic counter-electrode 14 is applied over and adherent to said layer 13. This counter-electrode may conveniently be made of a metallic alloy such as an alloy of cadmium and bismuth. One suitable alloy is the eutectic mixture comprising 40% cadmium and 60% bismuth.

If desired, the order of applying the barrier layers can be reversed; that is, the organic barrier layer can be applied directly to the selenium, and the inorganic barrier layer can be applied over the organic layer. The counter electrode is applied to the inorganic layer when the order of the barrier layers is reversed.

A rectifier prepared according to the above process is given its rectifying characteristics by an electroforming process which can be carried out by applying an A.C. voltage across the base plate and the counter electrode, usually in series with some resistance or capacitance. This will build up the interfaces which produce the rectifying action, according to known principles. A multiple barrier-layer rectifier according to this invention requires less electroforming time than presently known single layer rectifiers.

It should be understood that the thickness of the various layers 11–14 in the drawing are not shown in their true proportionate sizes relative to the base plate. All of the layers are shown disproportionately thick with relationship to the base plate for purposes of illustration.

Dry plate selenium rectifiers of this type are connected for use in a circuit by suitable conductive contact elements (not shown) which make a substantial surface contact with counter-electrode 14, and with base plate 10. A circuit can thereby be established through the rectifier between the aforesaid base plate and the counter-electrode. The rectifier, by virtue of its greater resistance in one direction of flow than in the other, permits substantial current flow in only one direction. By the provision of the multiple barrier layers as disclosed herein, this rectifier can withstand greater reverse voltages with less leakage than can known rectifiers which utilize only a single barrier layer.

This invention is not to be limited by the embodiments shown in the drawings and described in the description which are given by way of example and not of limitation, but only in accordance with the scope of the appended claims.

I claim:

1. A dry plate rectifier comprising: a metal base plate; a layer comprising selenium applied to said base plate; a first barrier layer applied over and adherent to said selenium; a second barrier layer applied over and adherent to said first barrier layer, one of said barrier layers comprising an inorganic salt, and the other of said barrier layers comprising a film-forming organic material; and a counter-electrode comprising a conductive metal applied over and adherent to said second barrier layer.

2. A rectifier according to claim 1 in which film-forming organic material is a material selected from the group consisting of polyamide resins, nylon, nitro-cellulose, cellulose aceto-butyrate, cellulose acetate, ethyl cellulose, polystyrene, and phenolic resins.

3. A rectifier according to claim 2 in which the inorganic salt is a salt selected from the group consisting of cadmium sulfide, cadmium selenide, and mixtures of cadmium sulfide and cadmium selenide.

4. A rectifier according to claim 3 in which the layer which comprises a film-forming organic material includes selenium dioxide.

5. A rectifier according to claim 3 in which the layer which comprises a film-forming organic material includes magnesium nitrate.

6. A rectifier according to claim 3 in which the layer which comprises a film-forming organic material includes cadmium nitrate.

7. A rectifier according to claim 3 in which the layer which comprises a film-forming organic material includes an amine.

8. A rectifier according to claim 7 in which said amine is selected from the group consisting of: aniline, para phenylene diamine, metaphenylene diamine, pyridine, ethylene diamine, diethyl amine, monoethanolamine, diethanolamine, triethanolamine, morpholene, diethylenetriamine, toluene diamine, toluidine, n-methyl para phenylenediamine, n-methyl meta phenylenediamine, and benzidine.

9. A dry plate rectifier comprising: a metal base plate; a layer comprising selenium applied to said base plate; a first barrier layer comprising a salt selected from the group consisting of cadmium selenide, cadmium sulfide, and mixtures of cadmium selenide and cadmium sulfide applied over and adherent to said selenium; a second barrier layer comprising a film-forming organic material selected from the group consisting of polyamide resins, nylon, nitro-cellulose, cellulose aceto-butyrate, cellulose acetate, ethyl cellulose, polystyrene, and phenolic resins applied over and adherent to said first barrier layer; and a counter-electrode comprising a conductive metal applied over and adherent to said second barrier layer.

10. A rectifier according to claim 9 in which the second barrier layer comprises cellulose acetate.

11. A rectifier according to claim 9 in which the second barrier layer comprises nitrocellulose.

12. A rectifier according to claim 9 in which the second barrier layer comprises nylon.

13. A rectifier according to claim 9 in which the layer which comprises a film-forming organic material includes selenium dioxide.

14. A rectifier according to claim 9 in which the layer which comprises a film-forming organic material includes magnesium nitrate.

15. A rectifier according to claim 9 in which the layer which comprises a film-forming organic material includes cadmium nitrate.

16. A rectifier according to claim 9 in which the layer which comprises a film-forming organic material includes an amine.

References Cited in the file of this patent

UNITED STATES PATENTS

| | | |
|---|---|---|
| 2,334,554 | Hewlett | Nov. 16, 1943 |
| 2,468,527 | Geel et al. | Apr. 26, 1949 |

FOREIGN PATENTS

| | | |
|---|---|---|
| 522,092 | Great Britain | June 7, 1940 |